United States Patent
Lee (10) Patent No.: US 9,591,588 B1
(45) Date of Patent: Mar. 7, 2017

(54) DETERMINING ACCESS POINT POWER OUTPUT

(71) Applicant: Hewlett Packard Enterprise Development LP, Houston, TX (US)

(72) Inventor: Jiwoong Lee, Sunnyvale, CA (US)

(73) Assignee: Aruba Networks, Inc., Sunnyvale, CA (US)

(*) Notice: Subject to any disclaimer, the term of this patent is extended or adjusted under 35 U.S.C. 154(b) by 0 days.

(21) Appl. No.: 15/171,528

(22) Filed: Jun. 2, 2016

(51) Int. Cl.
- H04B 7/00 (2006.01)
- H04W 52/24 (2009.01)
- H04W 88/08 (2009.01)

(52) U.S. Cl.
CPC ....... H04W 52/242 (2013.01); H04W 52/245 (2013.01); H04W 52/247 (2013.01); H04W 88/08 (2013.01)

(58) Field of Classification Search
CPC ............. H04W 52/242; H04W 52/146; H04W 52/243; H04W 24/02; H04W 72/082; H04W 52/367; H04W 88/08; H04W 52/245; H04W 52/24; H04W 36/0072; H04W 52/04; H04W 52/143; H04W 52/38; H04W 52/08
USPC .......... 455/522, 69, 68, 500, 517, 450, 509, 455/67.11, 423–425, 445, 426.1, 426.2, 455/452.1, 453.2, 508, 513, 514, 422.1, 455/403, 550.1; 370/252, 254, 310, 328, 370/315, 329, 338, 343
See application file for complete search history.

(56) References Cited

U.S. PATENT DOCUMENTS

2015/0146543 A1* 5/2015 Diener ............... H04W 52/40 370/248

* cited by examiner

Primary Examiner — Keith Ferguson
(74) Attorney, Agent, or Firm — Hewlett Packard Enterprise Patent Department (57) ABSTRACT

Examples relate to determining access point power output. In one example, a computing device may: identify, for a particular access point, a plurality of neighboring access points; identify, for each neighboring access point, a pathloss value that indicates a difference in a transmit power of the neighboring access point and a received signal strength observed by the particular access point; identify, from the neighboring access points, at least one adjacent access point, each adjacent access point having a pathloss value that is less than a pathloss threshold; generate a representative pathloss using the pathloss values of each adjacent access point; determine a target power level for the representative pathloss; and provide at least one of the neighboring access points with instructions that cause the at least one neighboring access point to adjust a power output level of the at least one neighboring access point.

15 Claims, 5 Drawing Sheets

DETERMINING ACCESS POINT POWER OUTPUT

BACKGROUND

Wireless network communications devices, such as personal computers, mobile phones, Wi-Fi access points, and cellular network access points, transmit data across wireless networks. Access point placement and power output may have a significant impact on the quality of wireless communications and may also affect user behavior and satisfaction.

BRIEF DESCRIPTION OF THE DRAWINGS

The following detailed description references the drawings, wherein.

DETAILED DESCRIPTION

Wireless access points generally use antennas to emit wireless signals that can be received and used by other wireless devices. Wireless signal strength may depend on a variety of factors, such as the power output of a wireless access point, wireless congestion from other wireless communications, and interference from electrical sources and physical objects. To increase wireless coverage for an area, multiple wireless access points are often deployed near each other in order to increase wireless availability and signal strength for devices that make use of the network. Power output for each of the wireless access points that are part of a network may be determined by using pathloss values—reduction in power of wireless signals as they propagate through space—observed by at least one of the access points.

For example, several Wi-Fi access points may be deployed throughout a building to provide wireless network coverage for client devices that operate within the building. Each access point has an output power, e.g., measured in decibel-milliwatts (dBm), and each access point is also capable of receiving frames/signals from other nearby access points. For one particular access point, pathloss values measured in dB may be determined for each other nearby, or neighboring, access point, e.g., by determining the difference between the transmit power and received signal strength, which may also be measured in dBm. For example, a particular access point may determine the received signal strength of another access point is −70 dBm, and given a transmit power of 20 dBm, the pathloss between the other access point and the particular access point would be 90 dB (20 dBm−(−70 dBm)=90 dB).

After determining pathloss for each neighboring access point of the particular access point, the pathloss values may be used to identify, from the neighboring access points, adjacent access points. Adjacent access points need not be physically adjacent, but are access points that have pathloss that is less than pathloss of non-adjacent access points. In some implementations, a pathloss threshold is generated for a particular access point based on pathloss values of all neighboring access points. For example, a constant value may be added to the lowest pathloss value to create a pathloss threshold; access points having pathloss value below the threshold may be considered adjacent access points.

The pathloss values of the adjacent access points may be used to generate a representative pathloss. For example, the average or median pathloss value of the adjacent access points may be used to determine a representative pathloss. Given a target received signal strength, such as −75 dBm, and a representative pathloss, such as 90 dB, a target transmission power level may be determined, e.g., a target power level may be determined by adding the representative pathloss to the target received signal strength, resulting in a 15 dBm (90+−75=15) target transmit power level.

The target transmit power level may be used to adjust power output for at least one of the neighboring access points. The manner in which power levels are adjusted and/or determined may vary. In some implementations, each neighboring access point and/or each adjacent access point may be instructed to adjust its power output level to the target transmit power level, e.g., 15 dBm. In some implementations, the target transmit power level is modified based on pathloss to determine transmit power level adjustments, e.g., the target transmit power may be raised for access points having higher pathloss values and lowered for access points having lower pathloss values.

In some implementations, power levels may be determined iteratively, e.g., for the same particular access point and/or for multiple access points. Smoothing may be used in a manner designed to ensure that access points provide enough coverage for the area they are in and to avoid situations that lead to sticky clients and/or over-use or under-use of any particular access point. Further details regarding access point power level determination are provided in the paragraphs that follow.

Figure 1:
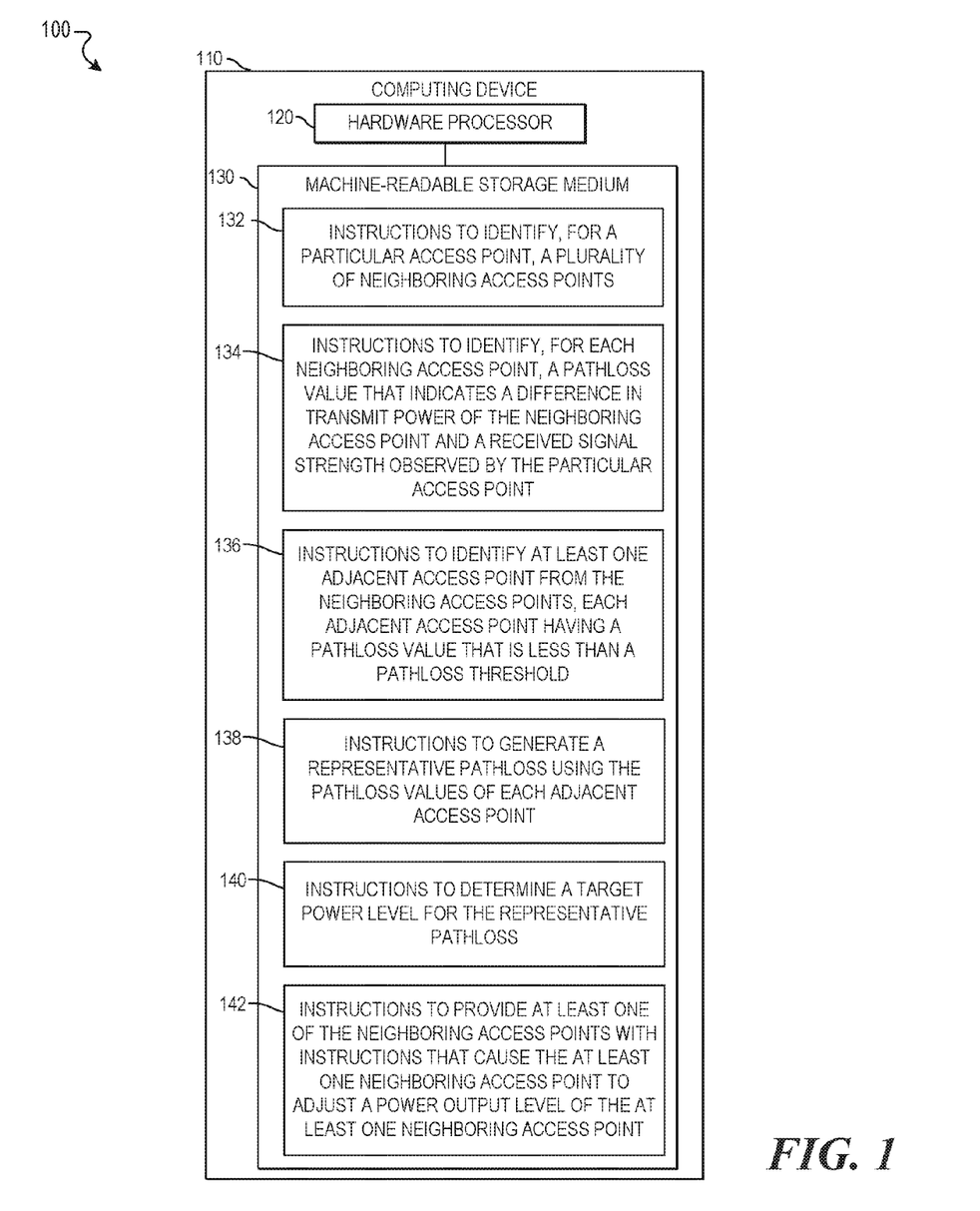
FIG. 1 is a block diagram of an example computing device for determining access point power output.

Referring now to the drawings, FIG. 1 is a block diagram 100 of an example computing device 110 for determining access point power output. Computing device 110 may be, for example, a cellular device, such as a cell phone, a personal computer, a server computer, a wireless router, or any other similar electronic device capable of processing data. In the example implementation of FIG. 1, the computing device 110 includes a hardware processor, 120, and machine-readable storage medium, 130.

Hardware processor 120 may be one or more central processing units (CPUs), semiconductor-based microprocessors, and/or other hardware devices suitable for retrieval and execution of instructions stored in machine-readable storage medium, 130. Hardware processor 120 may fetch, decode, and execute instructions, such as 132-142, to control processes for determining access point power output. As an alternative or in addition to retrieving and executing instructions, hardware processor 120 may include one or more electronic circuits that include electronic components for performing the functionality of one or more instructions.

A machine-readable storage medium, such as 130, may be any electronic, magnetic, optical, or other physical storage device that contains or stores executable instructions. Thus, machine-readable storage medium 130 may be, for example, Random Access Memory (RAM), non-volatile RAM (NVRAM), an Electrically Erasable Programmable Read-Only Memory (EEPROM), a storage device, an optical disc, and the like. In some implementations, storage medium 130 may be a non-transitory storage medium, where the term "non-transitory" does not encompass transitory propagating signals. As described in detail below, machine-readable storage medium 130 may be encoded with executable instructions: 132-142, for determining access point power output.

As shown in FIG. 1, the hardware processor 120 executes instructions 132 to identify, for a particular access point, a plurality of neighboring access points. In some implementations, each neighboring access point is an access point that provides at least one frame that the particular access point is capable of receiving and decoding. For example, neighboring access points may be identified for a particular access point using the beacon packets received by the particular access point. In this example, each access point that provides a beacon packet capable of being received and decoded by the particular access point is a neighboring access point of the particular access point.

The hardware processor 120 executes instructions 134 to identify, for each neighboring access point, a pathloss value that indicates a difference in transmit power of the neighboring access point and a received signal strength observed by the particular access point. For example, a first neighbor may transmit at 25 dBm, and a received signal strength of −65 dBm at the particular access point results in a pathloss value of 90 dB for that first neighbor. As another example, a second neighbor may transmit at 18 dBm, and a received signal strength of −78 dBm at the particular access point results in a pathloss value of 96 dB.

The hardware processor 120 executes instructions 136 to identify, from the neighboring access points, at least one adjacent access point, each adjacent access point having a pathloss value that is less than a pathloss threshold. A pathloss threshold may be determined in a variety of ways. In some implementations, the pathloss threshold may be determined by adding a constant C to the minimum pathloss observed in neighboring access points. The constant C may, for example, be predetermined, determined by an administrator, or may be determined based on other information, e.g., as a function of access point density or a measure of wireless interference. Given an example constant C of 8 dB and a minimum neighboring access point pathloss of 75 dB, an example pathloss threshold may be 83 dB (75+8=83). The pathloss threshold may also be determined based on other information, such as an average or median pathloss of the neighboring access points.

The hardware processor 120 executes instructions 138 to generate a representative pathloss using the pathloss values of each adjacent access point. For example, the representative pathloss may be an average, median, weighted arithmetic mean, geometric mean, mode, maximum, or minimum pathloss of all adjacent access points. E.g., given three adjacent access points with pathloss values of 75 dB, 78 dB, and 81 dB, the arithmetic mean pathloss of 78 dB ((75+78+81)/3=78) may be used as the representative pathloss.

The hardware processor 120 executes instructions 140 to determine a target power level for the representative pathloss. For example, given a target signal strength measurement, e.g., −65 dBm, the target power level may be determined by calculating the power output that would be result in the target signal strength given the representative pathloss. Using a representative pathloss of 78 dB and a target signal strength measurement of −65 dBm, the target power level may be determined to be 13 dBm (78+−65=13).

The hardware processor 120 executes instructions 142 to provide at least one of the neighboring access points with instructions that cause the at least one neighboring access point to adjust a power output level of the at least one neighboring access point. For example, the hardware processor 120 may cause a power level value, such as 13 dBm, to be sent to one of the neighboring access points, e.g., using wireless or wired communications, and the neighboring access point may adjust its output power, e.g., to 13 dBm, in response to receiving the value.

The power output level may be adjusted for any number of the neighboring access points in a variety of ways. For example, each neighboring access point may be instructed to change its power output level to 13 dBm. In some implementations, the hardware processor 120 may execute instructions to determine, for each neighboring access point, an adjusted power level based on i) the target power level, and ii) a neighborhood density of the neighboring access points. For example, an adjusted power level may be calculated for each adjacent and/or neighboring access point using the target power level as a baseline and modifying the target power level based on a measure of neighborhood density. E.g., for reach neighboring access point, a relatively high measure of neighborhood density may cause a decrease in the target power level, while a relatively low measure of neighborhood density may cause an increase in the target power level. Density may be measured for an access point in a variety of ways, e.g., relative numbers of adjacent and/or neighboring access points, measures of wireless congestion, relative received signal strength measurements, or a combination of one or more of the foregoing.

In some implementations, the hardware processor 120 executes instructions to perform spatial smoothing of adjusted power output levels of the plurality of neighboring access points. While individual adjusted power levels may be assigned to multiple access points in a network, spatial smoothing may be performed in a manner designed to bring power output levels of the access points closer to an average power output level of its neighboring access points. Spatial smoothing may be performed in a variety of ways, e.g., using standard deviations to adjust power levels to be within a particular number of standard deviations, or other known spatial smoothing techniques.

While the examples above describe determining access point power output using a single computing device 100, other types of computing devices may be used, and determining access point power output may be performed in a distributed manner. For example, one computing device may identify neighboring access points and pathloss values while another generates representative pathloss, determines target power levels, and provides instructions to neighboring access points. Other examples included herein are used to further describe various aspects of determining access point power output.

Figure 2:
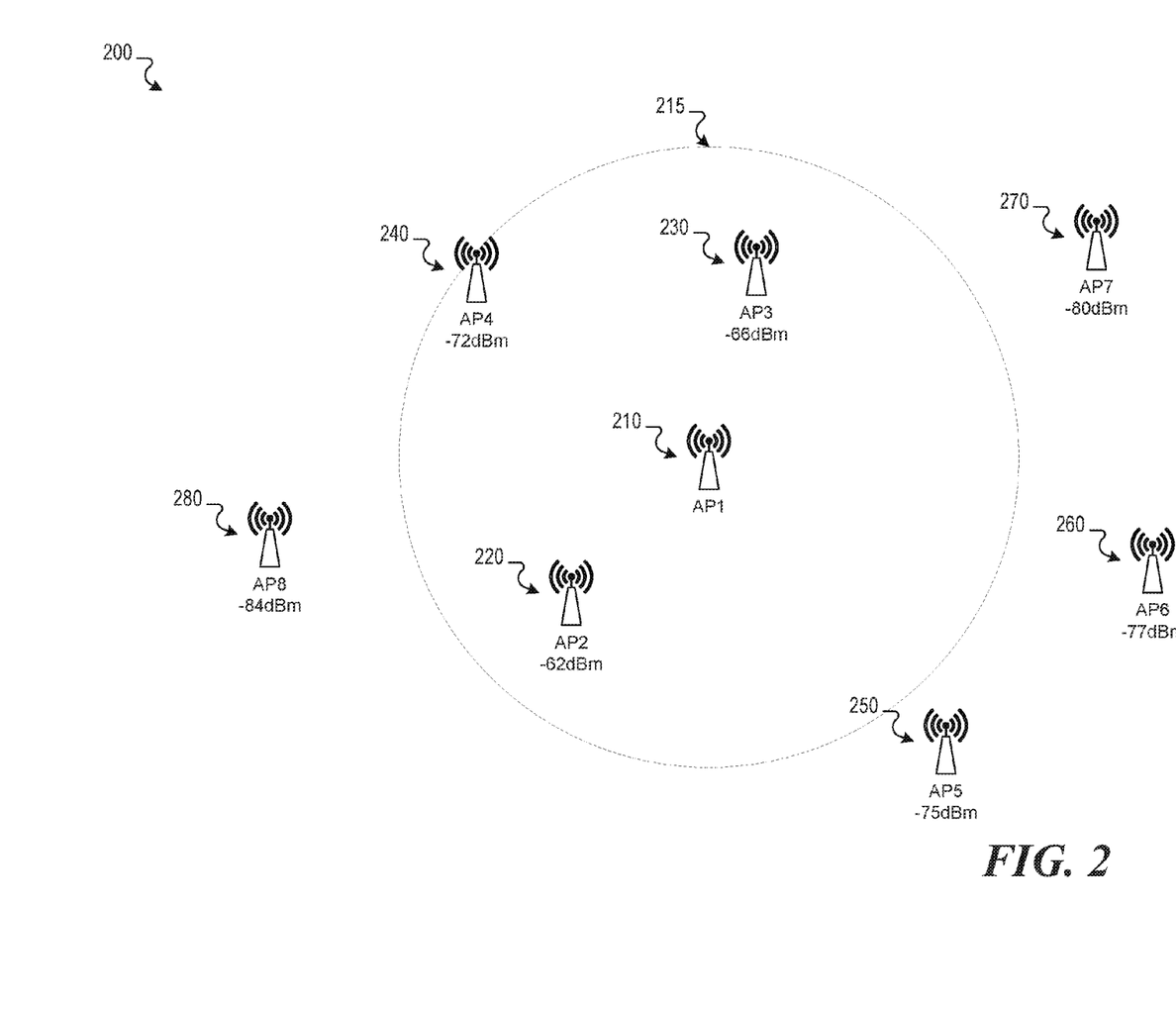
FIG. 2 is an example diagram depicting access points used for determining access point power output.

FIG. 2 is an example diagram 200 depicting access points used for determining access point power output. A computing device used to determine access point power output, such as computing device 100 of FIG. 1, may be included in or in communication with one or all of the depicted access points, such as AP1 210. The example diagram 200 depicts access point power output determination being performed using AP1 210.

Each other access point in the diagram 200, is a neighbor of AP1 210 and is depicted with a received signal strength indicator (RSSI) that specifies the signal strength observed by AP1 210. For example, the RSSI of AP2 220 is −62 dBm, the RSSI of AP3 230 is −66 dBm, the RSSI of AP4 240 is −72 dBm, the RSSI of AP5 250 is −75 dBm, the RSSI of AP6 260 is −77 dBm, the RSSI of AP7 270 is −80 dBm, and the RSSI of AP8 280 is −84 dBm.

Pathloss values for each neighboring access point are identified, or determined. For example, AP1 210 may obtain data that indicates the transmit power of each neighboring access point. In a situation where each neighboring access point is transmitting at 20 dB, pathloss values may be determined by subtracting the RSSI from the transmit power. For example, the pathloss for each of the neighboring access points in the diagram 200 may be as follows: 82 dB for AP2 220, 86 dB for AP3 230, 92 dB for AP4 240, 95 dB for AP5 250, 97 dB for AP6 260, 100 dB for AP7 270, and 104 dB for AP8 280.

In the example diagram 200, the dotted circle 215 is designed to provide a visual reference for identifying which of the neighboring access points are adjacent access points. Access points inside the dotted circle, e.g., AP2 220, AP3 230, and AP4 240, are adjacent access points, while those outside the dotted circle 215 are neighboring—but not adjacent—access points. In some implementations, adjacent access points may be identified using a pathloss threshold. For example, a pathloss threshold may be determined by adding a predetermined value, such as 10, to the minimum pathloss observed by AP1 210. In the situation above, the minimum pathloss observed by AP1 210 is 82 dB, resulting in a pathloss threshold of 92 dB. The access points having a pathloss at or below the pathloss threshold, in this example, are adjacent access points.

AP1 210 may generate a representative pathloss using the pathloss values of the adjacent access points. The adjacent access point pathloss values, in this example, are 82 dB, 86 dB, and 92 dB. In a situation where the average pathloss of adjacent access points is used for a representative pathloss, the representative pathloss would be 87 dB when optionally rounded to the nearest whole number ((82+86+92)/3=~86.7). As noted above, other methods may be used to generate a representative pathloss. For example, the median pathloss of adjacent access points, 86 dB in this example, could be the representative pathloss.

The representative pathloss is used to determine, for AP1 210, a target power level. In some implementations, the target power level is based on a target RSSI, e.g., determined by a network administrator. For example, a network administrator may set a target RSSI at −70 dBm. The target power level may be determined by adding the target RSSI of −70 dBm to the representative pathloss of 87 dB, resulting, in this example, of a target power level of 17 dBm.

The target power level may be used to adjust power output of neighboring access points in a variety of ways. For example, in some implementations, AP1 210 may provide each of its neighboring access points with instructions to adjust their respective output power levels to 17 dB. In some implementations, AP1 210 may provide only adjacent access points, or only neighboring non-adjacent access points, with instructions to adjust output power.

The target power level may, in some implementations, be further based on other data available to AP1 210. For example, the 17 dBm may be used as a base power level, which may be modified, e.g., in a linear or tiered manner, based on RSSI measurements observed by AP1 210. E.g., 17 dBm may be used as a base line power level for access points associated with an RSSI between −70 dBm and −80 dBm, access points associated with a stronger RSSI, e.g., −69 dBm or higher, may use a decreased power level such as 16 dBm, and access points associated with a weaker RSSI, e.g., −81 dBm or lower, may use an increased power level such as 18 dBm. In some implementations, one power level may be used for adjacent access points while a different power level may be used for neighboring, non-adjacent, access points.

Other methods may also be used to modify the adjusted power level before or after instructing access points to adjust their power output.

In some implementations, spatial smoothing techniques may be used to adjust access point power levels. Spatial smoothing techniques are designed to improve the signal to noise ratio of the access points. For example, an access point AP1 may be assigned 20 dBm while its one adjacent neighbor is to be assigned to be 10 dBm, before smoothing. By taking self-weight factor of alpha=0.7, AP1's power can be smoothed to 20*alpha+10*(1−alpha)=20*0.7+10*0.3=17 dBm and AP2's power can be smoothed to 10*alpha+20*(1−alpha)=10*0.7+20*0.3=13 dBm. In this example, AP1's power is smoothed from 20 to 17 dBm, and AP2's power is smoothed from 10 to 13 dBm. The power difference between AP1 and AP2 is reduced from 10 dB (20-10) before smoothing and becomes 4 dB (17-13) after smoothing.

Figure 3:
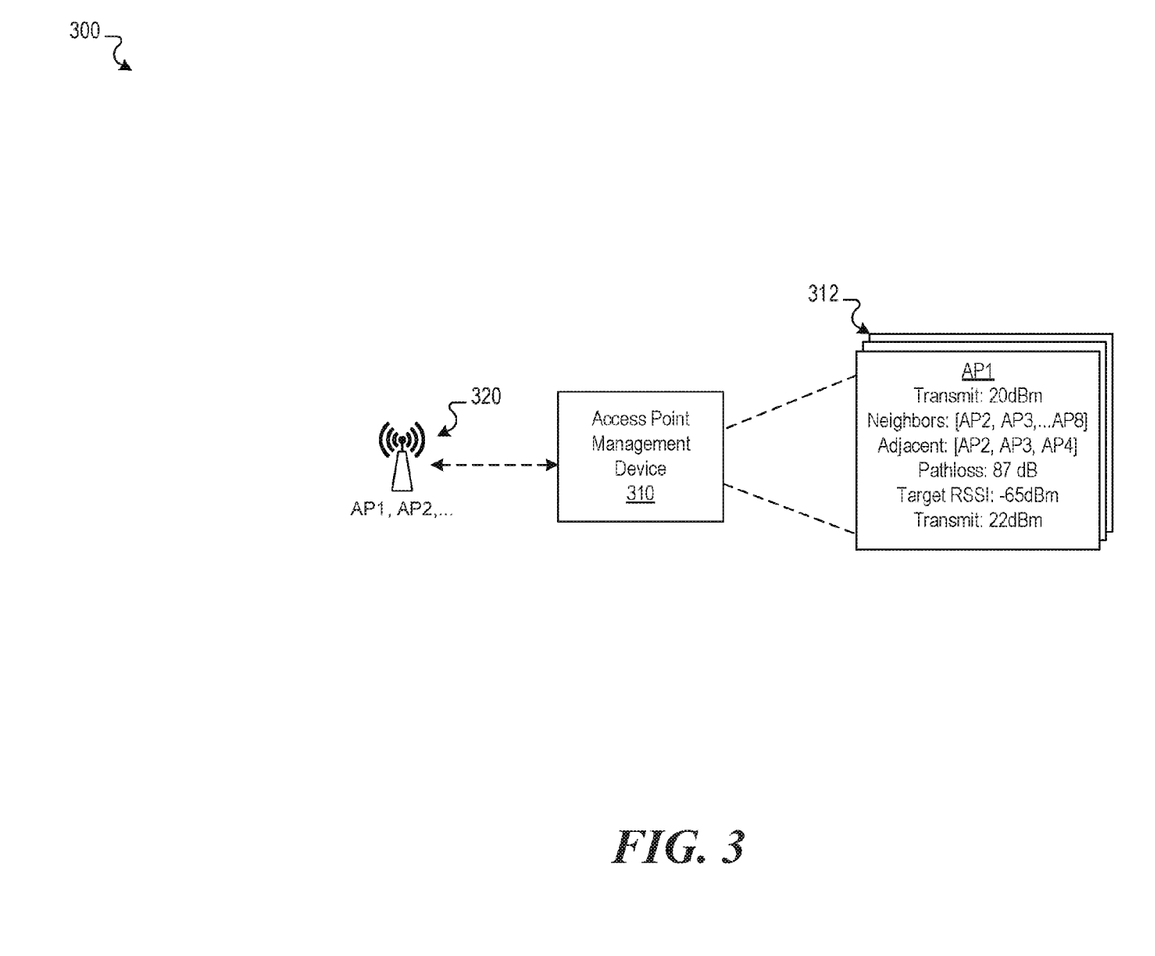
FIG. 3 is an example data flow depicting determining access point power output.

FIG. 3 is an example data flow 300 depicting determining access point power output. An example access point management device (APMD) 310 is depicted in the example data flow 300, and the device 310 may be implemented, for example, in an access point or a separate computing device supporting the features described above for determining access point power output, e.g., the computing device 110 of FIG. 1.

In the example data flow, the APMD 310 is in communication with multiple access points 320. Communications may be wired and/or wireless, and in some implementations, the APMD 310 may be included in another device, such as an access point, network switch, or server computer. During operation, the APMD 310 may gather data from each of the access points 320 and use the information to determine access point power output for the access points 320, e.g., in a manner similar to that described above. Data gathered from and calculated for the access points 320 is depicted in profiles 312 for each access point.

For example, the example profile for AP1 indicates a transmit power of 20 dBm, a determined representative pathloss of 87 dB, and a list of neighboring and adjacent access points. The profile 312 also indicates the target RSSI for AP1, which in this example is −65 dBm. The profile 312 for AP1 includes an adjusted transmit power of 22 dBm, e.g., calculated by the APMD using calculations and determinations described above with respect to FIGS. 1 and 2.

In some implementations, the APMD 310 determines and assigned access point power output in an iterative fashion, e.g., performing calculations for each access point and smoothing power output values after each calculation. Power output may be determined and/or re-determined in response to certain events, such as the addition or removal of an access point, or periodically, e.g., hourly, daily, weekly, etc.

Figure 4:
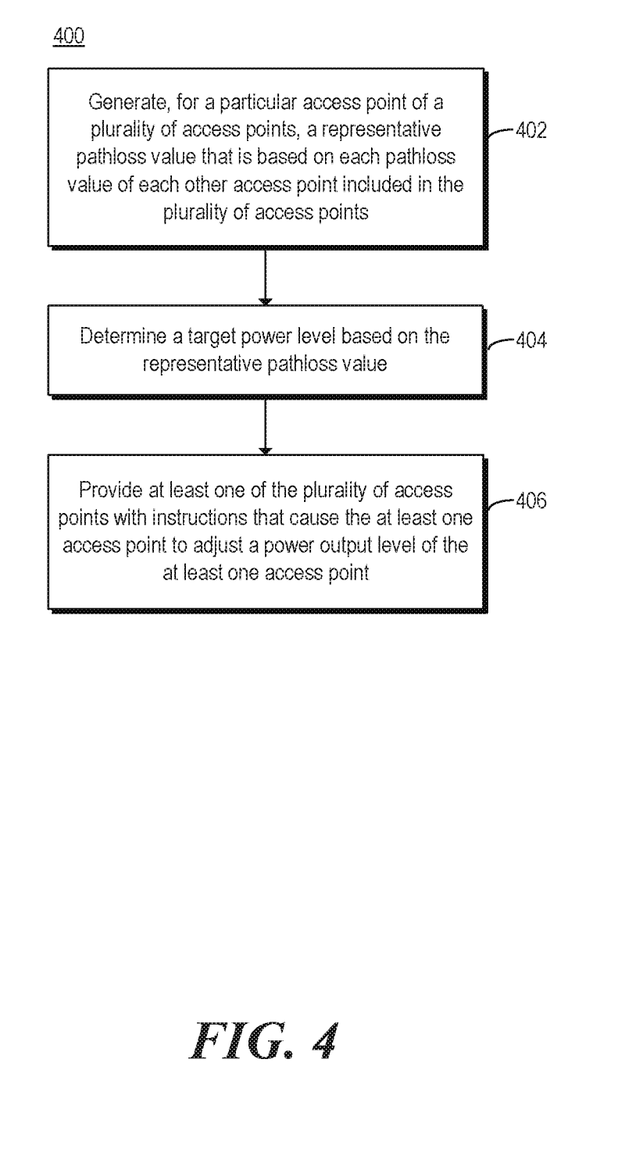
FIG. 4 is a flowchart of an example method for determining access point power output.

FIG. 4 is a flowchart of an example method 400 for determining access point power output. The method 400 may be performed by a computing device, such as a computing device described in FIG. 1, e.g., in the form of an access point or server computer. Other computing devices may also be used to execute method 400. Method 400 may be implemented in the form of executable instructions stored on a machine-readable storage medium, such as the storage medium 130, and/or in the form of electronic circuitry.

A representative pathloss is generated for a particular access point of a plurality of access points (402). The representative pathloss value is based on each pathloss value of each other access point included in the plurality of access points. In some implementations, the representative pathloss may be the median pathloss observed by the access point for all of the other plurality of access points. For example, if the other access points had pathloss values of 70, 80, 90, 120, and 125 dB, the median of 90 dB may be chosen as the representative pathloss.

In some implementations, the plurality of access points are identified from a set of neighboring access points, each neighboring access point being an access point that provides at least one frame that the particular access point is capable of receiving and decoding. For example, access points broadcast beacon packets with a variety of information, such as an SSID for wireless devices to receive and decode. Beacon packets may be used to identify neighboring access points from which the plurality of access points are selected.

In some implementations, a pathloss threshold is determined based on pathloss values observed by the particular access point and associated with each of the neighboring access points. In this situation, the plurality of access points may be identified from the set of neighboring access points using the pathloss threshold and the pathloss values associated with each of the neighboring access points. For example, a pathloss threshold may be determined as being 130 dB in a situation where the average pathloss of each neighboring access points is determined to be 130 dB. The access points within the threshold pathloss of 130 dB are identified as the plurality of access points, e.g., adjacent access points.

A target power level is determined based on the representative pathloss value (404). In the example above, the representative pathloss is 90 dB. Given an administrator specified target RSSI of −67 dBm, for example, the target power level may be determined to be 23 dBm, e.g., the result of adding the representative pathloss of 90 dB to the target RSSI of −67 dBm.

At least one of the plurality of access points is provided with instructions that cause the at least one access point to adjust a power output level of the at least one access point (406). For example, data may be provided to each of the plurality of access points, the data specifying a target power level for the corresponding access point to use. Upon receipt of the data, each access point may use the target power level to adjust its corresponding power output.

In some implementations, for each neighboring access point, an adjusted power level is determined based on i) the target power level, and ii) a neighborhood density of the plurality of neighboring access points. For example, the target power level may be adjusted for each access point as a function of the number of neighboring and/or adjacent access points. E.g., an average number of adjacent and/or neighboring access points may be calculated for the access points in a neighborhood, and a particular access point may have its target power level increased in situations where the particular access point has fewer than average neighbors and decreased in situations where the particular access point has more than the average number of neighbors.

In some implementations, special smoothing of adjusted power output levels is performed for the neighboring access points. For example, iterative adjustments may be made to smooth the output power of all access points in the neighborhood in a manner designed to reduce gaps in potential coverage and avoid potentially detrimental overlaps in coverage areas.

Figure 5:
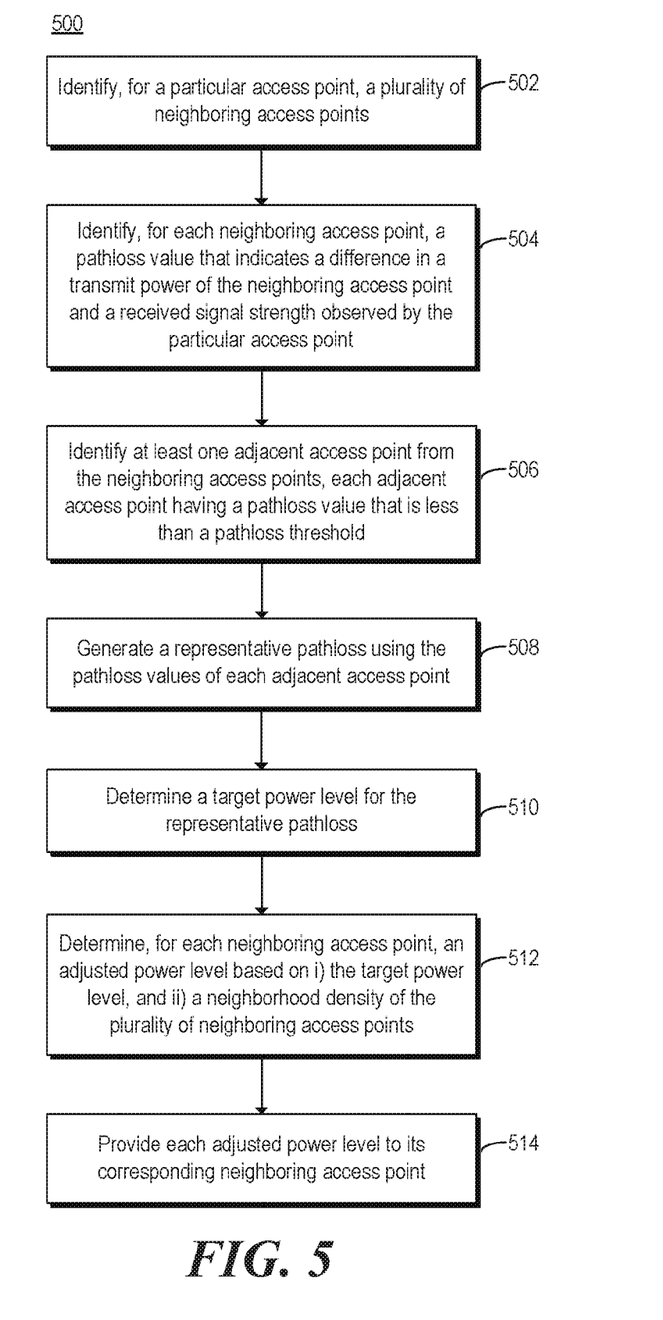
FIG. 5 is a flowchart of an example method for determining power output for access points.

FIG. 5 is a flowchart of an example method 500 for determining power output for access points. The method 500 may be performed by a computing device, such as a computing device described in FIG. 1, e.g., in the form of an access point or server computer. Other computing devices may also be used to execute method 500. Method 500 may be implemented in the form of executable instructions stored on a machine-readable storage medium, such as the storage medium 130, and/or in the form of electronic circuitry.

For a particular access point, a plurality of neighboring access points are identified (502). Neighboring access points may be identified for a particular access point, for example, using wireless beacon packets identified by the particular access point. Each access point from which the particular access point can receive and decode a beacon packet may be identified as a neighbor.

For each neighboring access point, a pathloss value is identified that indicates a difference in a transmit power of the neighboring access point and a received signal strength observed by the particular access point (504). For example, in a situation where a neighboring access point transmits at 25 dBm and the particular access point observes an RSSI of −75 dBm, the pathloss value for that neighboring access point is 100 dB.

From the neighboring access points, at least one adjacent access point is identified, each adjacent access point having a pathloss value that is less than a pathloss threshold (506). The pathloss threshold may be, for example, an average or median pathloss, or a minimum pathloss value plus a predetermined constant value.

A representative pathloss is generated using the pathloss values of each adjacent access point (508). For example, the median or average pathloss of the adjacent access points may be be used as the representative pathloss.

A target power level is determined for the representative pathloss (510). For example, a user may select a target signal strength of −70 dBm, and the target power level may be determined by adding the representative pathloss to the target signal strength. E.g., given representative pathloss of 85 dB, the target power level may be 15 dBm.

For each neighboring access point, an adjusted power level is determined based on i) the target power level, and ii) a neighborhood density of the plurality of neighboring access points (512). Neighborhood density may, in some implementations, be measured in a predetermined fashion, e.g., 5 neighboring access points may be determined to be a normal or base number of access points; access points with more than 5 neighbors may be more dense than those with less than 5 neighbors. For each access point over or under the base number, the target power level of 15 dB may be adjusted. For example, in a less dense neighborhood with 3 neighboring access points, the target power level may be increased, e.g., by 2 dB. In a more dense neighborhood with 8 neighboring access points, the target power level may be decreased, e.g., by 3. Other formulas and methods of adjusting power level may be used alone or in combination with the foregoing method, e.g., including the methods described above.

Each adjusted power level is provided to its corresponding neighboring access point (514). For example, each neighboring access point may be provided with data that includes the power level to which the neighboring access point should adjust. As in the methods described above, power levels may be adjusted over time and/or in an iterative fashion. Spatial smoothing methods may also be used in a manner designed to reduce significant variations in power output.

While the methods 400 and 500 are described with respect to a separate computing device and an access point, respectively, other computing devices may also be used for some or all of the steps of each method. For example, an access point may gather signal data such as RSSI measurements and pathloss, while a server computer may calculate target power levels and adjusted power levels to be provided to various access points in a network.

The foregoing disclosure describes a number of example implementations for determining access point power output. As detailed above, examples provide a mechanism for determining the power output of access points in a network based on pathloss and neighborhood features.

I claim:

1. A non-transitory machine-readable storage medium encoded with instructions executable by a hardware processor of a computing device for determining access point power output, the machine-readable storage medium comprising instructions to cause the hardware processor to:
identify, for a particular access point, a plurality of neighboring access points;
identify, for each neighboring access point, a pathloss value that indicates a difference in a transmit power of the neighboring access point and a received signal strength observed by the particular access point;
identify at least one adjacent access point from the neighboring access points, each adjacent access point having a pathloss value that is less than a pathloss threshold;
generate a representative pathloss using the pathloss values of each adjacent access point;
determine a target power level for the representative pathloss; and
provide at least one of the neighboring access points with instructions that cause the at least one neighboring access point to adjust a power output level of the at least one neighboring access point.

2. The storage medium of claim 1, wherein the instructions further cause the hardware processor to:
determine, for each neighboring access point, an adjusted power level based on i) the target power level, and ii) a neighborhood density of the plurality of neighboring access points.

3. The storage medium of claim 1, wherein the target power level is determined by adding a target observed signal strength to the representative pathloss.

4. The storage medium of claim 1, wherein the representative pathloss is generated as a function of the pathloss values of each adjacent access point.

5. The storage medium of claim 1, wherein the instructions further cause the hardware processor to:
perform spatial smoothing of adjusted power output levels of the plurality of neighboring access points.

6. A computing device for determining access point power output, the computing device comprising:
a hardware processor; and
a data storage device storing instructions that, when executed by the hardware processor, cause the hardware processor to:
generate, for a particular access point of a plurality of access points, a representative pathloss value that is based on each pathloss value of each other access point included in the plurality of access points;
determine a target power level based on the representative pathloss value; and
provide at least one of the plurality of access points with instructions that cause the at least one access point to adjust a power output level of the at least one access point.

7. The computing device of claim 6, wherein the instructions further cause the hardware processor to:
identify, for the particular access point, the plurality of access points from a set of neighboring access points, each neighboring access point being an access point that provides at least one frame that the particular access point is capable of receiving and decoding.

8. The computing device of claim 7, wherein the instructions further cause the hardware processor to:
determine a pathloss threshold based on pathloss values observed by the particular access point and associated with each of the neighboring access points, and
wherein the plurality of access points are identified from the set of neighboring access points using the pathloss threshold and the pathloss values associated with each of the neighboring access points.

9. The computing device of claim 7, wherein the instructions further cause the hardware processor to:
determine, for each neighboring access point, an adjusted power level based on i) the target power level, and ii) a neighborhood density of the neighboring access points.

10. The computing device of claim 7, wherein the instructions further cause the hardware processor to:
perform spatial smoothing of adjusted power output levels of the neighboring access points.

11. A method for determining access point power output, implemented by a hardware processor, the method comprising:
identifying, for a particular access point, a plurality of neighboring access points;
identifying, for each neighboring access point, a pathloss value that indicates a difference in a transmit power of the neighboring access point and a received signal strength observed by the particular access point;
identifying at least one adjacent access point from the neighboring access points, each adjacent access point having a pathloss value that is less than a pathloss threshold;
generating a representative pathloss using the pathloss values of each adjacent access point;
determining a target power level for the representative pathloss;
determining, for each neighboring access point, an adjusted power level based on i) the target power level, and ii) a neighborhood density of the plurality of neighboring access points; and
providing each adjusted power level to its corresponding neighboring access point.

12. The method of claim 11, wherein the target power level is determined by adding a target observed signal strength to the representative pathloss.

13. The method of claim 11, wherein the representative pathloss is generated as a function of the pathloss values of each adjacent access point.

14. The method of claim 11, wherein each neighboring access point is an access point that provides at least one frame that the particular access point is capable of receiving and decoding.

15. The method of claim 11, further comprising:
performing spatial smoothing of each adjusted power output level of the neighboring access points.

* * * * *